May 14, 1968

J. W. EBBS 3,383,534

STATOR FOR ELECTRIC MOTORS

Filed April 5, 1965

INVENTOR.
JOHN W. EBBS

BY his ATTORNEYS

May 14, 1968 J. W. EBBS 3,383,534
STATOR FOR ELECTRIC MOTORS
Filed April 5, 1965 2 Sheets-Sheet 2

INVENTOR.
JOHN W. EBBS
BY
his ATTORNEYS

United States Patent Office 3,383,534
Patented May 14, 1968

3,383,534
STATOR FOR ELECTRIC MOTORS
John W. Ebbs, Woodstock, N.Y., assignor to Rotron Manufacturing Company Inc., Woodstock, N.Y., a corporation of New York
Filed Apr. 5, 1965, Ser. No. 445,403
4 Claims. (Cl. 310—257)

The present invention relates to an improvement in electrical machinery, and more particularly to an improved stator construction for electric motors.

Conventional stators for electric motors are formed of a plurality of laminations, insulated from each other and fastened together by rivets or the like. As is well known, the laminations significantly reduce eddy current losses in the stator iron as compared to a solid stator construction, and thereby increase motor efficiency. Up to now, substantially all alternating current motors have been made with laminated stators.

It is the object of the present invention to provide a solid stator construction for electric motors which minimizes the losses normally associated with such devices and which can be fabricated with a simplicity that compensates for the somewhat lower operational efficiency.

In accordance with this invention, there is provided a novel and improved stator structure, comprising a pair of mating, unlaminated members composed of a sintered powdered metal which has electrical and magnetic properties to insure proper motor operation with minimized losses. The two members are of substantially the same configuration and so constructed as to greatly facilitate assembly and reduce production costs. It has been found, particularly with small motors, that, with this novel construction, core losses can be held within reasonable limits so that the motor can operate at reasonable efficiencies.

For a more complete understanding of the invention, reference may be had to the following detailed description taken in conjunction with the figures of the accompanying drawings, in which.

Figure 1:
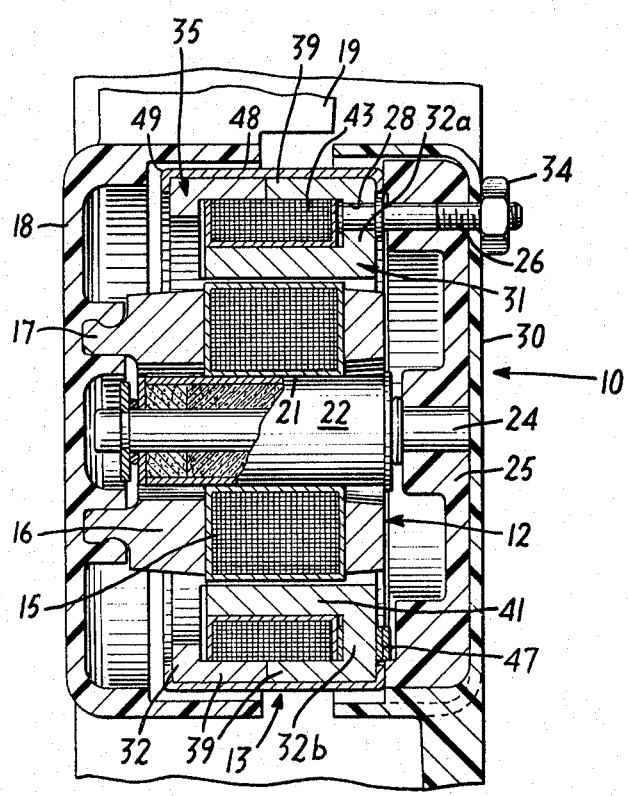
FIGURE 1 is a view in vertical section through a motor incorporating the invention showing the stator structure in relation to other elements of the motor, the section through the stator being taken along the lines 1—1 of FIGURE 2.

Referring to FIGURE 1 of the drawings, an electric motor 10 embodying the present invention is shown. This motor 10 has a rotor 12 and a stator assembly shown generally at 13. The rotor 12 comprises a stack 15 incorporating the rotor bars and having end rings formed of a conductive metal, such as aluminum. As shown, one of the end rings of the rotor 12 is provided with an undercut extension 17, which mates with a circular detent groove on the inner wall of the housing member 18. The housing 18 rotates with the stack 15 and can, for example, carry a fan member 19.

The axial bore of the stack 15 carries a sleeve 21 which encloses any suitable form of bearing indicated generally at 22. As shown, bearing 22 may comprise a pair of porous bronze bushings separated by an oil saturated felt wick, in a conventional manner. However, the bearing itself forms no part of the present invention and any convenient arrangement may be employed to journal the rotor structure on the stationary shaft 24. The latter is tightly fitted within the end bracket 25 in the stator assembly and is supported in cantilever fashion.

The stator assembly 13 is shielded from dirt and dust by a cup-shaped casing 30 which may also incorporate suitable mounting brackets or flanges (not shown). The shaft-supporting end bracket 25 and the casing 30 are fastened together by bolts 26 and nuts 34, the bolts 26 being anchored in the stator members, as hereinafter described.

Figure 2:
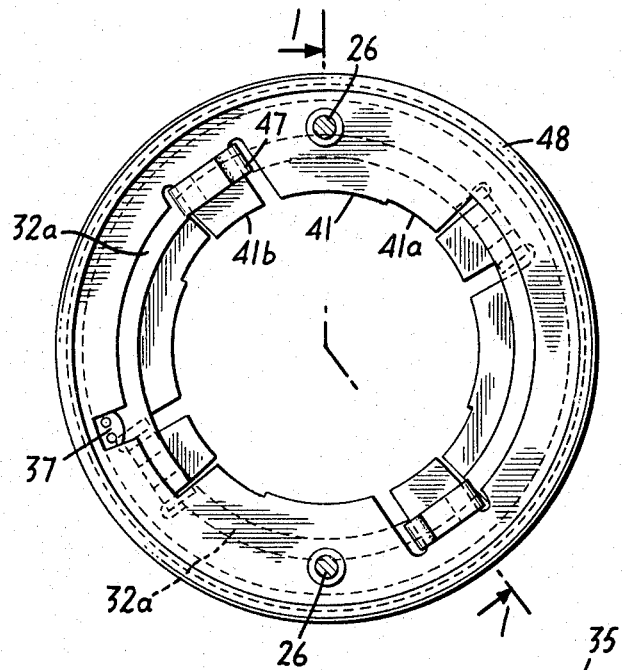
FIGURE 2 is a front view of an assembled stator structure in accordance with the invention.
Figure 3:
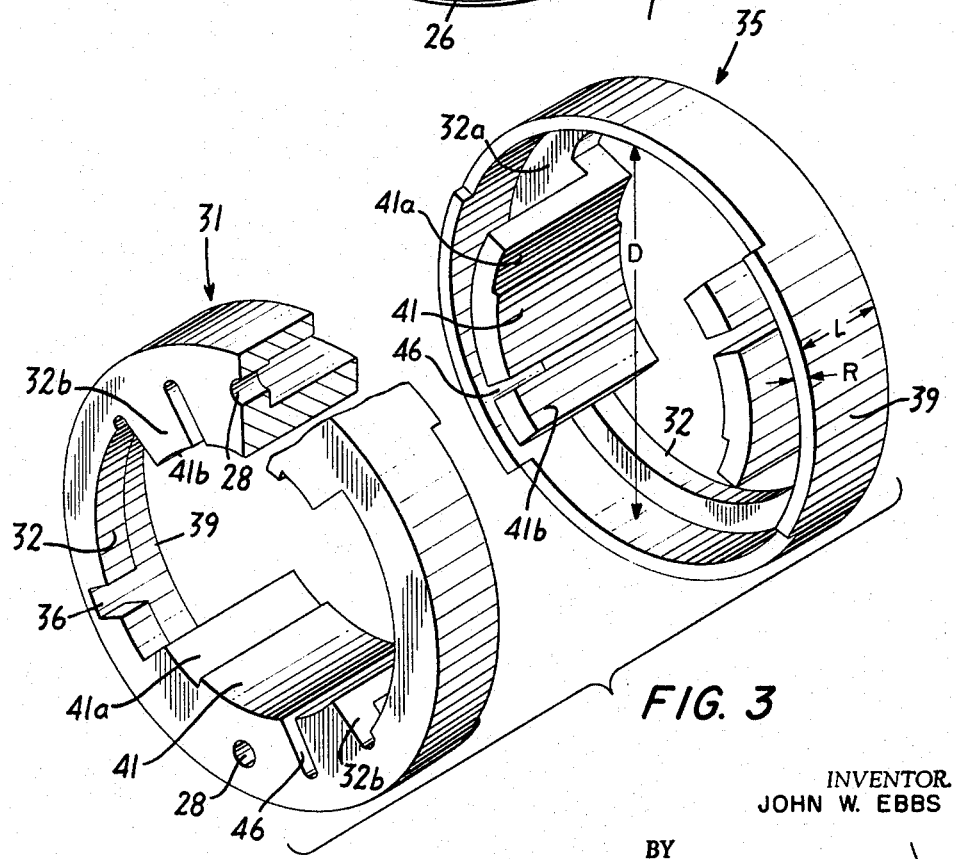
FIGURE 3 is an exploded view partially broken away showing the structural details of the two stator structure members.

As best seen in FIGURES 2 and 3, the stator assembly 13 comprises a pair of mating solid members 31 and 35. Both of these members 31 and 35 are formed of ferromagnetic material, such as silicon iron, which exhibits high electrical resistivity and thereby minimizes the development of induced currents within the mass. The material, in powdered form, is first pressure molded to the desired shape and then sintered in a furnace to form the finished member.

Since the members 31 and 35 are substantially similar, only one will be described in detail. As seen in FIGURE 3, member 35 comprises an outer ring portion 39 having a radial thickness R and an axial length L, both relatively small with respect to its diameter D. A web portion 32 is integrally formed with the ring 39 and extends radially inwardly thereof along its arcuate length. The radial extent of the web is increased along oppositely disposed portions of the ring 39, as indicated at 32a.

At the inner extremity or end of each of the web portions 32a is an integral and arcuately formed pole section 41 which is substantially concentric with its associated ring 39 (and the rotor 12, see FIGURE 2), and has an axial length greater than the dimension L of the ring 39. A portion 41a of the inner curved surfaces of each of the pole sections 41 adjacent one edge thereof is of a greater diameter than the remainder of the section to present a stepped pole face. The increased air-gap between the pole section 41a and the rotor provides a high reluctance path for the flux, thereby decreasing the flux which passes between adjacent pole tips and improving motor operation, in a known manner.

Each of the pole sections 41 includes an axially extending slot 46 which effectively divides the pole section in two parts. The slot is closer to one edge of the pole section than the other and arranged to receive a shading coil. Preferably, shading coil 47 consisting of a single, short-circuited turn of copper (see FIGURES 1 and 3) is employed. It will be noted that coil 47 surrounds a small segment 32b of the web portion 32a adjacent one edge 41b of the pole section 41. As is well known, the shading coil 47 produces a flux which lags the flux in the main portion of the pole section. This creates a rotating field moving in the direction from the unshaded to the shaded edge 41b of the pole section 41, to thereby establish a starting torque.

As seen in FIGURE 1, when the members 31 and 35 are secured together in mating or abutting relationship, the pole sections 41 cooperate with their associated webs 32 and rings 39 to provide an arcuate channel for receiving the insulated stator field coil 43. The narrower portion of the web 32 insures that the stator coil 43 is retained between the members when assembled.

The web portions 32a of the member 31 are provided with bores 28 to receive the flanged ends of the bolts 26. The latter extend through the end bracket 25 and casing 30, and nuts 34 return the several members in assembled relationship. A cylindrical snap ring 48 (FIGURE 2) maintains the stator members 31 and 35 in position, with the ends of the rings 39 in abutting relation. The member 48 is provided with slightly rolled ends 49 which snugly engage the members 31 and 35. If it is desired for some reason to examine the coil 43, the resilient snap ring 48 can be readily removed and the stator structure disassembled.

As is apparent from FIGURE 3, each of the stator members 31, 35 is one-piece and may be readily formed of the powdered iron in a single molding operation. The various openings and cuts, such as 28, and the slots setting off the shaded pole segments, may either be molded in or machined after sintering.

Except for the location of the stepped portions 41a and the shaded pole segments, and the slot 36, the members 31 and 35 are identical and, if desired, may be made in the same mold, with the proper stepped and shaded pole configuration added by machining. The slot 36 need be provided only in one of the members and serves to provide a space for a connector 37 (FIGURE 2) to bring out the leads of the stator coil 43.

Assembly of the entire stator structure may be accomplished quickly and simply. The bolts 26 are first inserted through the bores 28 with the flanged ends interiorly of the web portions 32a. Next, the coil 43 is inserted in the channel provided in the member 35 and the mating member 31 placed in proper abutting relationship. The snap ring is then mounted in place to hold the members in assembly. Finally, the bolts 26 are inserted in the holes provided in the end bracket 25 and the casing 30, and the nuts 34 tightened.

The above-described embodiment of the invention is merely by way of example, and many modifications will occur to those skilled in the art without departing from the spirit and scope of the invention. While a four pole stator construction has been shown, the same principles are applicable to stators having fewer or a greater number of poles. Accordingly, the invention should not be limited except as set forth in the appended claims.

I claim:

1. In an electric motor having a rotor and a stator, a stator structure comprising, a pair of mating solid annular rings of sintered ferromagnetic metallic material exhibiting high electrical resistivity, said rings being substantially similar in configuration, each having a radial thickness and axial length relatively small with respect to its outer diameter, at least one web portion formed integrally with each of said rings and extending radially inward thereof along at least a part of its arcuate length, each said web portion terminating at its inner extremity with an integral, arcuately formed pole section concentric with its associated ring and extending axially thereof for a distance at least as great as the axial length, the rotor to be supported substantially concentrically between the inner arcuate curved surfaces of said pole sections, a portion of each of said inner curved surfaces of said pole sections adjacent one edge thereof having a greater radius than the remainder to thereby present a step pole face to said rotor, said pole sections and said rings defining a plurality of arcuate channels concentric with said rings for receiving a field coil, a slot provided in at least one of said pole sections and associated webs on each ring, said slot being relatively closer to one edge of said pole section than the other, a shading coil disposed in said slot and surrounding the small portion of the web defined thereby, and means to maintain said rings in a coaxial abutting relationship.

2. A stator structure according to claim 1, wherein said shading coil comprises a single closed loop conductor.

3. A stator structure according to claim 1, wherein said maintaining means includes a snap ring member in engagement with each of said annular rings.

4. In an electric motor having a rotor and a stator, a stator structure comprising, a pair of mating solid annular rings of sintered ferromagnetic metallic material exhibiting high electrical resistivity, said rings being substantially similar in configuration, each having a radial thickness and axial length relatively small with respect to its outer diameter, at least one web portion formed integrally with each of said rings and extending radially inward thereof along at least a part of its arcuate length, each said web portion terminating at its inner extremity with an integral, arcuately formed pole section concentric with its associated ring and extending axially thereof for a distance at least as great as the axial length, the rotor to be supported substantially concentrically between the inner arcuate curved surfaces of said pole sections, a portion of each of said inner curved surfaces of said pole sections adjacent one edge thereof having a greater radius than the remainder to thereby present a step pole face to said rotor, said pole sections and said rings defining a plurality of arcuate channels concentric with said rings for receiving a field coil, a slot provided in at least one of said pole sections and associated webs on each ring, said slot being relatively closer to one edge of said pole section than the other, a single closed loop conductor coil disposed in said slot and surrounding the small portion of the web defined thereby, and means to maintain said rings in a coaxial abutting relationship including a snap ring member in engagement with each of said annular rings.

References Cited

UNITED STATES PATENTS 2,901,645  8/1959  Sulger _____ 310—166

MILTON O. HIRSHFIELD, *Primary Examiner.*

R. W. TEMPLETON, *Assistant Examiner.*